June 11, 1963     J. K. ROYLE     3,093,159

HYDRAULIC CONTROL VALVE

Filed July 20, 1959

INVENTOR

JOSEPH KENNETH ROYLE

BY *Larson and Taylor*

United States Patent Office 3,093,159
Patented June 11, 1963

3,093,159
HYDRAULIC CONTROL VALVE
Joseph Kenneth Royle, Manchester, England, assignor to National Research Development Corporation, London, England, a British corporation
Filed July 20, 1959, Ser. No. 828,290
Claims priority, application Great Britain June 10, 1959
4 Claims. (Cl. 138—46)

This invention relates to control valves in which movement of one member relative to another member varies that portion of a fluid pressure supply fed to an inlet which appears at a pressure take-off outlet whereby the pressure at the take-off outlet may be readily varied between the inlet and outlet pressures.

According to the invention there is provided a pressure control valve comprising a valve body and a valve member, capable of relative movement, at least one surface on the valve member cooperating with and being spaced from at least one surface on the valve body, the said surfaces defining at least one path for the flow of a liquid therethrough having a resistance to the said flow, at least one pressure inlet, fluid flowing from each pressure inlet through the said path to an exhaust outlet and a pressure take-off outlet, and means for moving the valve member relative to the valve body so that the relationship between the resistance to flow of fluid from the pressure inlet to the exhaust outlet and the resistance to flow of fluid from the pressure inlet to the pressure take-off outlet, is varied, whereby the proportion of the pressure at the pressure inlet which appears at the pressure take-off outlet is varied.

According to a further feature of the invention there is provided a pressure control valve comprising a valve body and a valve member, capable of relative movement, at least one pressure inlet, fluid flowing from the said pressure inlet to at least one pressure take-off outlet to at least one exhaust outlet, and means for moving the valve member relative to the valve body so as to vary the fluid flow to the said exhaust outlet, whereby the proportion of the pressure at the pressure inlet which appears at the pressure take-off outlet is varied.

The disclosed valve may serve as a means for tapping a variable static flow fluid pressure from a fluid flow line. The source and exhaust at the two ends of this line are maintained at constant pressure and the setting of the valve thus bears a simple relation to the static pressure at the tapping. A valve according to the disclosed invention may be used, for example, as a pilot for a main valve in the fluid supply line leading to the hydraulic ram of a milling machine. This machine may be required to work at constant cutting speed, and should the cutting tool meet greater resistance a signal indicating the ram's need for fluid at higher pressure is passed to the pilot valve, the setting of which is quickly and accurately altered by means of a simple rotary or longitudinal movement of the valve member.

The invention will be more readily understood by the following description of certain embodiments in conjunction with the accompanying drawings in which, FIGURE 1 is a sectional elevation of one embodiment of the invention;

Figure 1:
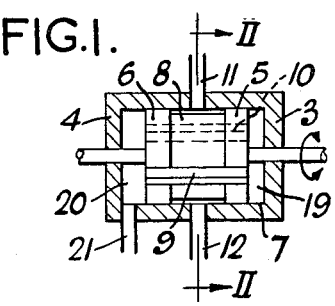
Figure 2:
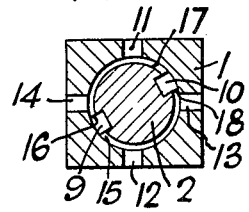
FIGURE 2 is a cross section of the line II—II of FIGURE 1.

In FIGURES 1 and 2, which illustrate a rotary form of the invention, a valve body 1 contains a spool 2. The valve body is cylindrical the ends being closed by walls 3 and 4. The spool is capable of rotation within the valve body, having two lands 5 and 6 formed one at each end, the lands being a close fit in bore 7 of the valve body. Between these lands is a portion 8 of slightly reduced diameter. Stems projecting one at each end, from the spool, pass through the walls 3 and 4 providing means for rotating it. Machined radially into the spool and extending the length of it are two ports 9 and 10. These ports cooperate with four ports 11, 12, 13 and 14 formed in the valve body 1 and equally spaced round the bore 7. Ports 11 and 12 are connected to a pressure supply and the ports 13 and 14 to a suitable exhaust which is maintained at a constant pressure lower than the pressure of the fluid in the inlet ports.

The valve operates as follows. Fluid from the pressure supply is fed in through ports 11 and 12, a small flow of fluid from port 11 to port 13 and from port 12 to port 14 taking place through the clearance created by the slightly reduced portion 8 of the spool 2. It is also apparent that there will be some flow from port 11 to port 14 and from port 12 to port 13. The pressure in the ports 9 and 10 is intermediate that obtaining in ports 11 and 12 and that obtaining in ports 13 and 14. The value of the pressure in the ports 9 and 10 will depend upon the rotational position of the spool 2, which governs the ratio between the pressure drop across the restrictions 15 and 16 in the case of port 9 and across the restrictions 17 and 18 in the case of port 10. The two ports 9 and 10 act as potentiometers, having substantially the same pressures in them at any one rotational position of the spool 2, this pressure being fed to the two chambers 19 and 20, formed one at each end between the land portions 5 and 6 and the end walls 3 and 4. The actual flow of fluid through the ports 9 and 10 is very small, in comparison with the flow through ports 13 and 14. A pressure take-off outlet 21 is provided from one of the chambers, and the pressures maintained in the two chambers are the same, so that no resultant longitudinal thrust is exerted upon the spool 2. An indicating member, not shown, may be fitted to one of the said stems to cooperate with markings on the adjacent end walls of the valve body to indicate the relative rotational position of the spool within the valve body.

Figure 3:
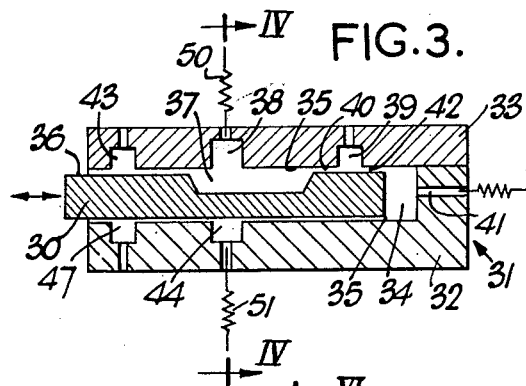
FIGURE 3 is a sectional elevation of another embodiment of the invention.
Figure 4:
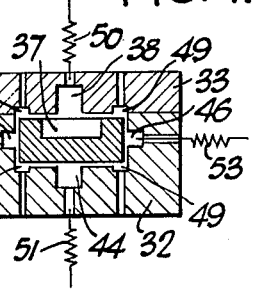
FIGURE 4 is a cross section on the line IV—IV of FIGURE 3.

FIGURES 3 and 4 illustrate a flat form of the invention the pressure at a take-off outlet being varied by a longitudinal movement. A valve member 30 is carried in a valve body 31 comprising two cooperating body parts 32 and 33. Body part 32 has a channel shaped groove 34 formed in the face which cooperates with the other body part 33. When the two body parts are placed together, the groove then forms a bore 35 of rectangular cross section within which slides the valve member 30. The valve member is in the form of a flat plate, there being a small clearance between the surfaces of the valve member and of the bore 35. Formed in the top surface 36 of the valve member is a rectangular hollow 37. A pressure supply port 38 is formed in the body part 33 in such a position that it is always completely uncovered by the hollow 37 in the valve member. A further port 39 is formed in the body part 33 and always cooperates with the top surface 36 of the valve member, forming a pressure take-off outlet. Pressure fluid is fed in via the port 38, there being a flow through restriction 40 to port 39. An exhaust port 41 is formed at the end of the bore 35 and a proportion of the flow through the restriction 40 will flow through a further restriction 42 to the exhaust port 41. The proportion of the pressure at the inlet port 38 which appears at the port 39 will depend upon the relative lengths of the restrictions 40 and 42. These lengths, in turn, depend upon the longitudinal position of the valve member 30 relative to the valve body 31. If the exhaust port 41 is connected to exhaust via a resistance, a back pressure will build up in the bore 35 which will elevate the pressure at 40, and as the valve is moved to give increased pressure output there will be a transient elevation of pressure at 40. This extra variation of pressure due to rate of change of valve displacement is desirable in many applications. In order to allow easy movement of the valve member, a pressure fluid supply may be fed to ports 44, 45 and 46, in the bottom and sides of the bore, the fluid flowing in the clearance between the valve member surfaces and the surfaces of the bore 35 to exhaust ports 47, 48 and 49 also formed in the bottom and sides of the bore. There will also be a flow of fluid from the hollow 37 to an additional exhaust port 43. These inlet and exhaust ports will cooperate to form fluid bearing pads in a known manner to apply equal pressure to the sides of the valve member 30. By inserting fluid resistances 50, 51, 52 and 53, of predetermined value in the pressure fluid supply lines, the pressure pads will act to maintain the valve member central in the bore 35.

Figure 5:
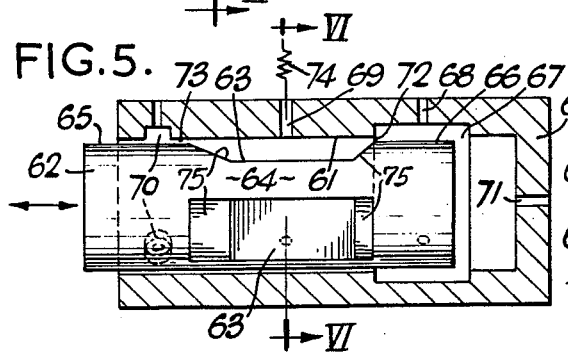
FIGURE 5 is a sectional elevation of a further embodiment of the invention.
Figure 6:
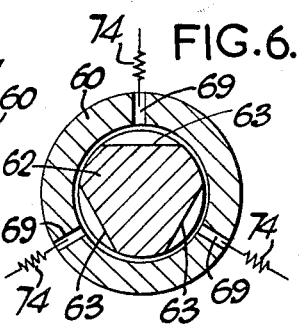
FIGURE 6 is a cross section on the line VI—VI of FIGURE 5.

The embodiment illustrated in FIGURES 5 and 6 is also one in which the pressure at the pressure take-off outlet is varied by longitudinal movement of a valve member, but is cylindrical in form. A valve body 60 has a circular bore within which slides a cylindrical valve member 62. A small clearance exists all the way round between the valve member and the bore 61. Three flats 63 are formed on the central portion 64 of the valve spool, equally spaced around the circumference, leaving two fully cylindrical portions 65 and 66, one each end of the valve member. Formed in that part of the bore 61 cooperating with the cylindrical portion 66 of the valve member is an annular recess 67. A connection 68 to this recess acts as the pressure take-off outlet. Three pressure fluid inlet ports 69 are provided in the bore 61, one opposite each of the flats 63. Three exhaust ports 70 are also formed in the bore 61, positioned so as to cooperate with the cylindrical portion 65 of the valve member. Each exhaust port is axially in line with a pressure inlet port. A vent 71 is provided at the end of the bore 61 to allow free movement of the valve member. Pressure fluid is fed to the ports 69, fluid flowing through restriction 72 formed by the adjunct edges of the flats 63 and the annular recess 67. A further flow of fluid takes place from the ports 69 to the exhaust ports 70 through restriction 73. The proportion of the pressure at the inlet ports 69 which appears at the pressure take-off outlet 68 will depend upon the relative resistance to flow of fluid of the restrictions 72 and 73. These in turn depend upon the relative longitudinal position of the valve member in the valve body. Each of the flats 63 with its associated inlet and exhaust ports will act as a pressure pad, equal pressure being applied to each of the flats to maintain the valve member 62 balanced, suitable resistances 74 being inserted in the pressure fluid supply pipes. It is preferable to chamfer the ends of the flats, as indicated at 75, to ensure high constant leakage flow to maintain the self-centering action.

Figure 7:
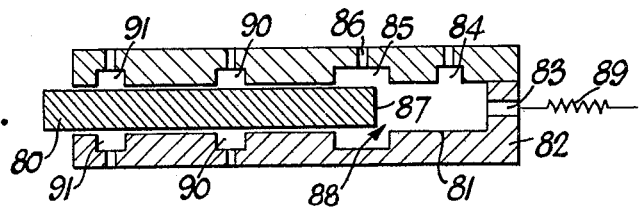
FIGURE 7 is a sectional elevation of yet another embodiment of the invention.

In the embodiment illustrated in FIGURE 7, a rectangular plate-like valve member 80 slides longitudinally in a bore of rectangular cross section 81 formed in a valve body 82. A pressure fluid inlet port 83 is provided in the end of the bore 81, and a pressure take-off outlet port 84 is formed in the wall of the bore 81 near the inlet port 83. A groove 85 is formed in the walls of and extending round the bore 81 displaced axially from the port 84 and on the side of port 84 remote from the inlet port 83. An exhaust outlet 86 is formed in the base of the groove 85. The inner end 87 of the valve member 80 cooperates with the annular groove 85 to provide a restriction, which varies with longitudinal movement of the valve member. The fluid is fed to the inlet port 83 through a resistance 89 and the variation of the restriction 88 relative to the resistance 89 will vary that proportion of the inlet pressure at port 83 which appears at the pressure take-off port 84. For ease of movement the valve member may be supported by pressure pads formed by cooperating inlet ports 80 and exhaust ports 91, provided on all four sides generally as in the embodiment illustrated in FIGURES 3 and 4 to maintain equal pressure on the sides of the valve member 80.

I claim:
1. A pressure control valve comprising a valve body, a valve member movable within said valve body, said valve body having at least one inlet for fluid under a first high pressure and at least one exhaust outlet for fluid at a second lower pressure, a pressure take off outlet from said valve, and means for varying the pressure at said take off outlet between the first and second pressures, said means including a restricted path providing resistance for fluid flow between said inlet and exhaust outlet and means for shifting said valve member to vary the effective length of said restricted path between said inlet and said take off outlet thereby varying the proportion of the pressure at the inlet appearing at the take off outlet.

2. A pressure control valve as claimed in claim 1 in which the relative movement of the valve parts is rotary.

3. A pressure control valve as claimed in claim 1 in which the valve body and valve member are movable longitudinally with respect to each other.

4. A pressure control valve as claimed in claim 1 in which at least part of the flow path from each pressure inlet to the corresponding pressure take-off outlet constitutes part of the path from the same pressure inlet to the corresponding exhaust outlet.

References Cited in the file of this patent
UNITED STATES PATENTS

| | | |
|---|---|---|
| 1,751,591 | McCloskey | Mar. 25, 1930 |
| 1,992,301 | Freebairn | Feb. 26, 1935 |
| 2,158,737 | Wunsch | May 16, 1939 |
| 2,572,950 | Rider | Oct. 30, 1951 |
| 2,597,177 | Plass | May 20, 1952 |
| 2,655,939 | Tauscher et al. | Oct. 20, 1953 |
| 2,911,008 | Du Bois | Nov. 3, 1959 |
| 2,938,544 | Simpson | May 31, 1960 |
| 2,968,474 | Eichelman et al. | Jan. 17, 1961 |

FOREIGN PATENTS

| | | |
|---|---|---|
| 649,020 | Great Britain | Jan. 17, 1951 |